United States Patent
Koc

(10) Patent No.: US 7,945,352 B2
(45) Date of Patent: May 17, 2011

(54) GENERALIZED PREDICTIVE CONTROL (GPC) BASED POSITION CONTROL METHOD FOR AN AXLE

(75) Inventor: Hakan Koc, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 135 days.

(21) Appl. No.: 12/227,469

(22) PCT Filed: Mar. 19, 2007

(86) PCT No.: PCT/EP2007/052566
§ 371 (c)(1),
(2), (4) Date: Nov. 18, 2008

(87) PCT Pub. No.: WO2007/134893
PCT Pub. Date: Nov. 29, 2007

(65) Prior Publication Data
US 2009/0143921 A1 Jun. 4, 2009

(30) Foreign Application Priority Data

May 18, 2006 (DE) .................. 10 2006 023 458

(51) Int. Cl.
*G05D 1/02* (2006.01)
*G05D 1/10* (2006.01)
*G05B 13/02* (2006.01)
*G05B 19/18* (2006.01)
*G01C 9/00* (2006.01)
*G01C 17/00* (2006.01)
*G01C 19/00* (2006.01)

(52) U.S. Cl. ............. 700/302; 700/28; 700/44; 700/64; 702/150; 702/151

(58) Field of Classification Search .................. 700/28, 700/44, 61, 64, 302; 702/150–151
See application file for complete search history.

(56) References Cited

U.S. PATENT DOCUMENTS 4,698,763 A * 10/1987 Smyth .............................. 701/56
(Continued)

FOREIGN PATENT DOCUMENTS
DE 3929615 A1 3/1991
(Continued)

OTHER PUBLICATIONS

Ralph Kennel, Arne Linder; "Prädiktive Regelung von umrichtergespeisten Antrieben umrichtergespeisten Antrieben, Ein Übersicht über die bisher bekannten Verfahren"; atp 44; 2002, pp. 46-51; Issue 11.

(Continued)

*Primary Examiner* — Ramesh B Patel

(57) ABSTRACT

A position value, a desired position value and future desired position values as well as, for each future desired position value, a value which is characteristic of the temporal offset between said future desired position value and the respective immediately preceding desired position value are predefined for a position controller for an axle. The position controller uses a model of the axle to determine a manipulated variable and a respective expected manipulated variable and an expected position value for the future desired position values. The position controller determines the manipulated variable, the expected variables and the expected position values in such a manner that a total deviation of the position value and the expected position values from the corresponding desired position values is optimized in accordance with a predetermined assessment function. It drives the axle in accordance with the manipulated variable.

5 Claims, 4 Drawing Sheets

U.S. PATENT DOCUMENTS

| | | | |
|---|---|---|---|
| 5,812,396 A * | 9/1998 | Kato | 700/61 |
| 5,974,906 A * | 11/1999 | Stine et al. | 74/335 |
| 6,296,081 B1 * | 10/2001 | Nagai et al. | 187/394 |
| 6,877,493 B2 * | 4/2005 | Kawamura et al. | 123/568.14 |
| 6,917,838 B2 | 7/2005 | Krüger et al. | |
| 2003/0000924 A1 | 1/2003 | Strang | |
| 2009/0030605 A1 * | 1/2009 | Breed | 701/208 |

FOREIGN PATENT DOCUMENTS

| | | |
|---|---|---|
| DE | 10129141 A1 | 12/2002 |
| DE | 10341574 A1 | 8/2004 |
| DE | 102004026979 A1 | 2/2005 |
| FR | 2689260 A1 | 10/1993 |
| GB | 2402499 A | 12/2004 |

OTHER PUBLICATIONS

D. Neumerkel, J. Franz, L. Krüger, A. Hidiroglu; Real-Time application of Neural Model Predictive Control for an Induction Servo Drive; Control Applications, 1994 / IEEE, Bd. 1, Aug. 24, 1994, S. 433-438, Internet: http://ieeexplore.ieee.org; Glasgow; IEEE; 1; Magazine; 1994.

R. Kennel, A. Lindner, M. Linke; Generalized Predictive Control (GPC)—Ready for Use in Drive Applications?; University of Wuppertal, DE; Power Electronics Specialists Conference, S. 1839-1844.; Vancouver, BC, Canada; IEEE; 4; XP002443652 .

* cited by examiner

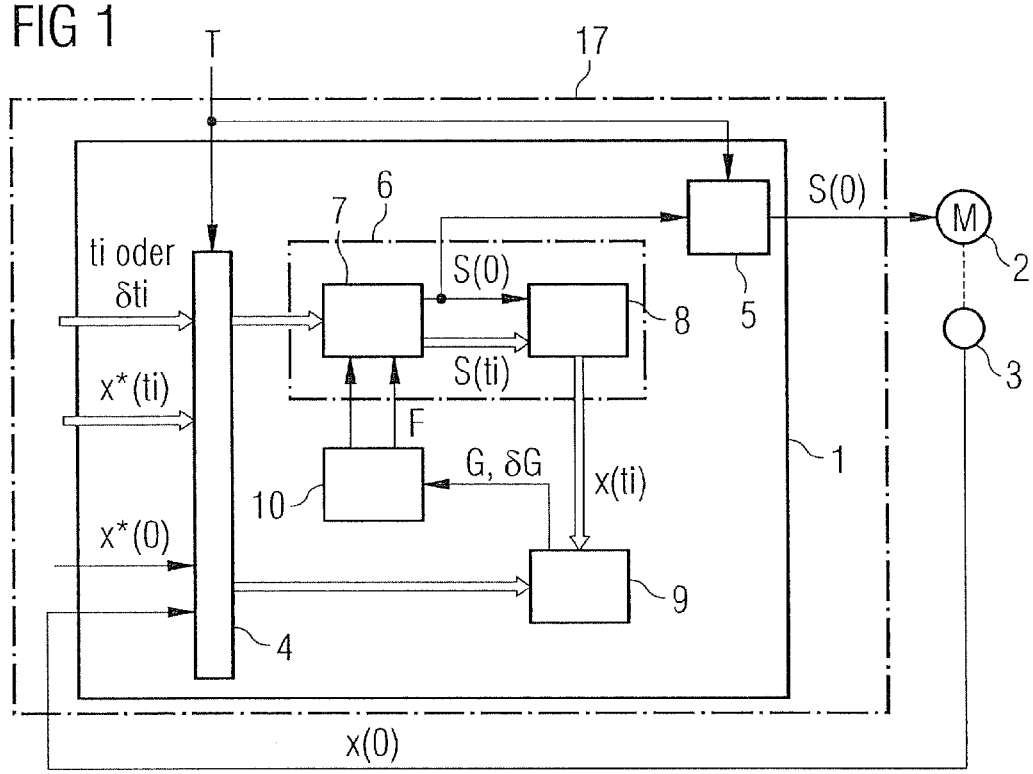
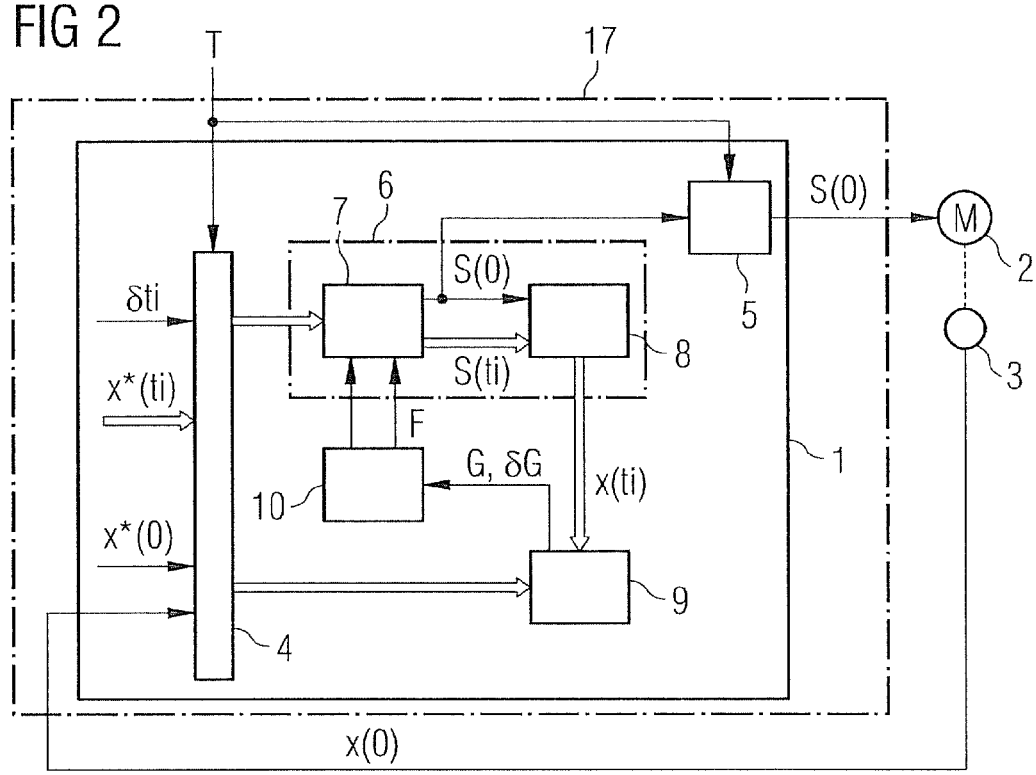

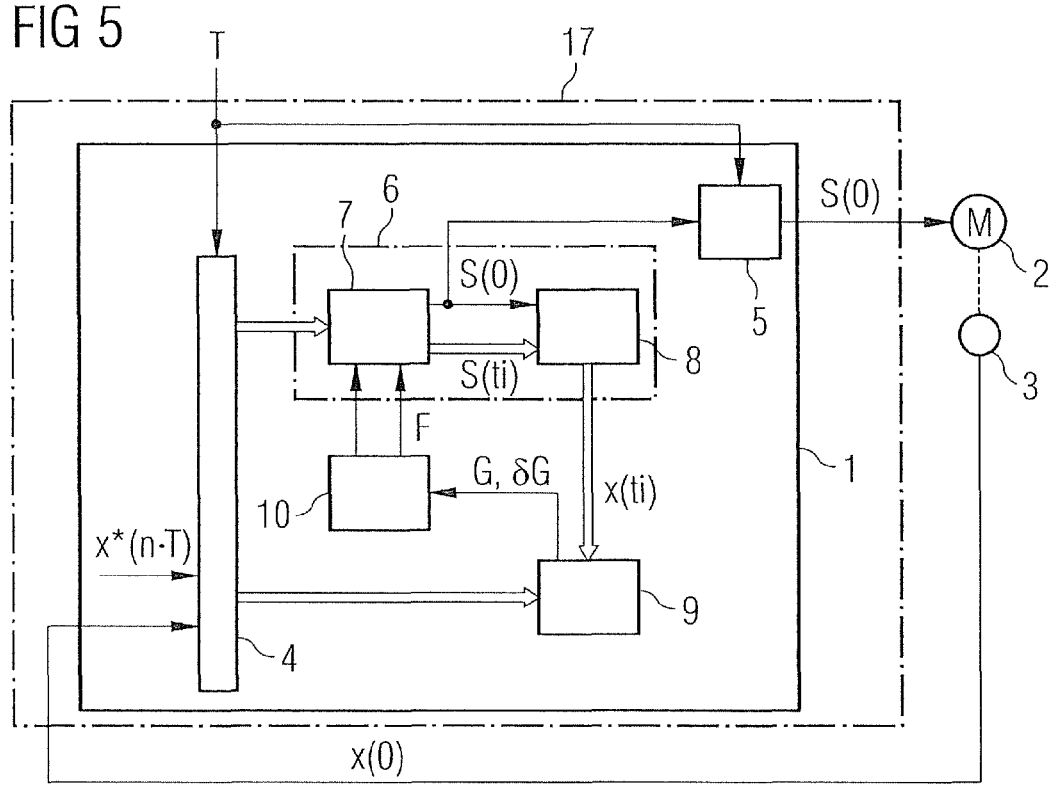
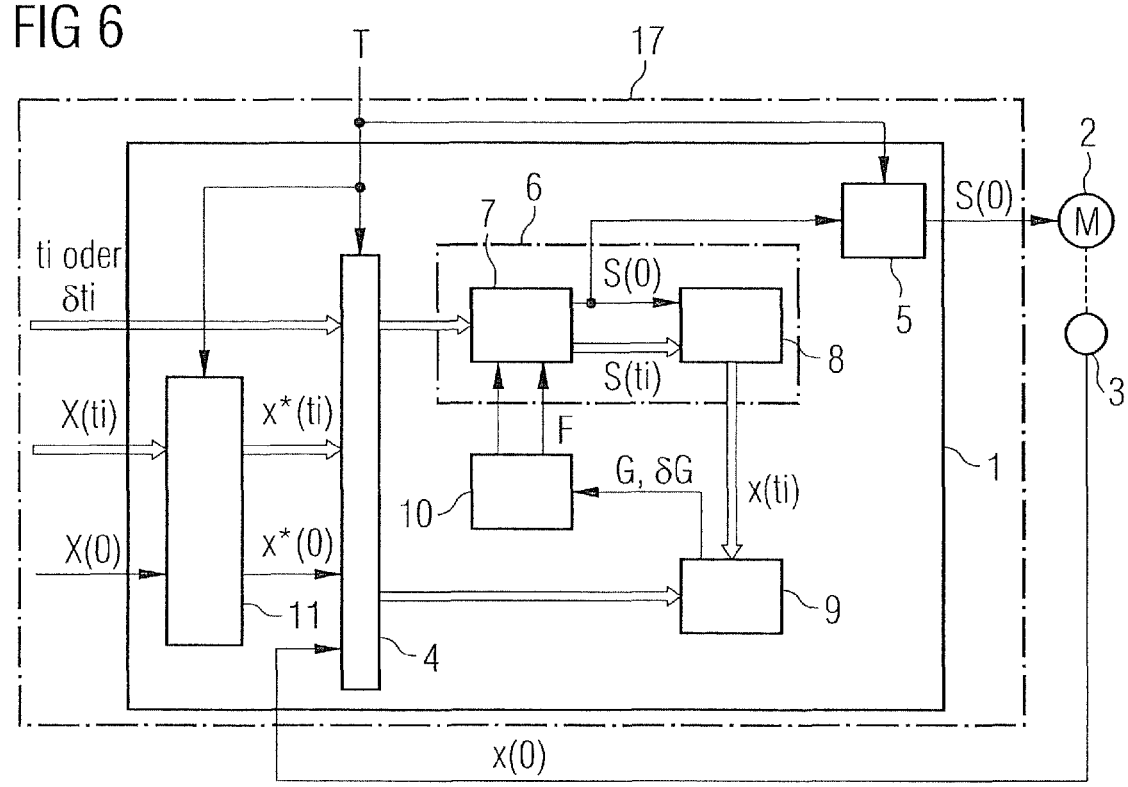

GENERALIZED PREDICTIVE CONTROL (GPC) BASED POSITION CONTROL METHOD FOR AN AXLE

CROSS REFERENCE TO RELATED APPLICATIONS

This application is the US National Stage of International Application No. PCT/EP2007/052566 filed Mar. 19, 2007, and claims the benefit thereof. The International Application claims the benefits of German application No. 10 2006 023 458.8 DE filed May 18, 2006. Both of the applications are incorporated by reference herein in their entirety.

FIELD OF INVENTION

The present invention relates to a position control method for an axle.

The present invention also relates to a position controller, which is configured in such a manner that it executes such a position control method during operation.

Finally the present invention relates to a data medium with a controller program stored on the data medium to implement such a position control method.

BACKGROUND OF INVENTION

Position control methods for an axle are generally known. Generally an instantaneous actual position value and an instantaneous setpoint position value are predefined for the position controller. The position controller determines an instantaneous manipulated variable according to a predetermined controller characteristic and actuates the axle according to the instantaneous manipulated variable. The controller characteristic can for example be a P, PI or PID controller characteristic. Further control circuits (for example a speed controller and/or a current regulator) can in some instances be subordinate to the position controller.

The procedure in the prior art produces satisfactory results in a plurality of applications. For some applications, where a high level of accuracy and rapid correction of control differences (i.e. the difference between the actual value and the setpoint value) are required, additional measures are however necessary.

It is thus known for example in the prior art that a speed controller can be subordinated to the position controller, to determine a speed pre-control value based on the temporal derivation of the setpoint position value (in other words the difference in relation to the temporally preceding setpoint position value, divided by the position controller cycle) and to apply the speed pre-control value additively to the manipulated variable of the position controller. This approach results in a smaller control deviation only in the case of essentially regular changes to the setpoint position value. It is also necessary to filter the instantaneous setpoint value supplied to the position controller. Otherwise there is a risk of controller instability.

In the prior art it is also known that a current regulator can be subordinated to the speed controller in addition to the speed pre-controller, to determine a current pre-control value for the current regulator based on the second temporal derivation of the setpoint position value and to apply the current pre-control value additively to the manipulated variable of the speed controller. This approach results in small control differences even in the case of irregularly changing setpoint position values. However the controller responds to manipulated variables in a very sensitive manner and tends toward instability.

In the field of large industrial units (for example for continuous casting plants and rolling mills) it is known that a so-called generalized predictive control (GPC) can be implemented. With such a type of control a number of future setpoint values are supplied to the controller in addition to the instantaneous actual value and the instantaneous setpoint value. The controller uses a model of the unit to be controlled to determine an instantaneous manipulated variable and actuates the unit to be controlled according to the instantaneous manipulated variable. The manipulated variable is determined in such a manner that an overall deviation of the instantaneous and future actual values from the corresponding setpoint values is optimized according to a predetermined evaluation function. For the last-mentioned type of control, see also for example the technical article "Generalized Predictive Control (GPC)—Ready for Use in Drive Applications?" by R. Kennel et al., University of Wuppertal and GB 2 402 499 A.

A similar disclosure content to that of the technical article by R. Kennel mentioned above is known from the technical article "Real-Time Application of Neural Model Predictive Control for an Induction Servo Drive" by D. Neumerkel et al., Control Applications, 1994/IEEE, vol. 1, Aug. 24, 1994, pages 433 to 438.

A position control method for an axle is known from FR 2 689 260 A, having the following features:
An instantaneous actual position value, an instantaneous setpoint position value and a number of future setpoint position values and for each future setpoint position value a value characteristic of its temporal offset in relation to the respectively immediately preceding setpoint position value are predefined for a position controller.
The position controller uses a model of the axle to determine an instantaneous manipulated variable and for the future setpoint position values an expected manipulated variable and an expected actual position value respectively.
The position controller determines the instantaneous manipulated variable, the expected manipulated variables and the expected actual position values in such a manner that an overall deviation of the instantaneous actual position value and the expected actual position values from the corresponding setpoint position values is optimized according to a predetermined evaluation function.
The position controller actuates the axle according to the instantaneous manipulated variable.

With the position control method known from FR 2 689 260 A it is possible to control the position of the axle with a good level of control accuracy while at the same time achieving a high level of control dynamics and yet low susceptibility to interference.

With the position control method known from FR 2 689 260 A the setpoint position values per se are supplied to the corresponding control facility.

SUMMARY OF INVENTION

An object of the present invention is to embody a position control method of the last-mentioned type in such a manner that it can be realized in a simple manner for a following axle (in other words an axle, whose setpoint position values are determined based on the setpoint and/or actual position values of a leading axle).

The object is achieved in respect of a method by a position control method according to the independent claim.

According to the invention the setpoint position values themselves are not supplied to the position controller but an instantaneous reference value is predefined for the position controller in addition to the instantaneous actual position value. A reference value change and a temporal offset between respectively immediately successive reference values are also predefined for the position controller. The position controller uses the instantaneous reference value, the reference value change and the temporal offset to determine the future reference values. It then uses the reference values to determine the corresponding setpoint position values. The further method steps follow in an identical manner to those in FR 2 689 260 A.

In order to be able to use the reference values to determine the setpoint position values, a functional relationship between the reference values and the setpoint position values must be known to the position controller. It is possible for the functional relationship to be periodic. In this instance the position controller realizes a disk cam functionality.

With regard to a device the object is achieved by a position controller, which is configured in such a manner that it executes such a position control method during operation. The position controller can be integrated in an ASIC.

The position controller can realize the inventive position control method in the form of a software solution or in the form of a hardware solution. Both solutions are possible regardless of whether or not the position controller is integrated in an ASIC.

If the position controller realizes the inventive position control method in the form of a hardware solution, its circuits are configured in such a manner that it can execute such a position control method.

If the position controller realizes the inventive position control method in the form of a software solution, it has a program memory and a work facility connected to the program memory. A controller program is stored in the program memory and can be executed by the work facility. During processing of the controller program, the work facility executes an inventive position control method.

In the case of a software solution the object is also achieved with regard to the program by a data medium with a controller program stored on the data medium, the controller program causing the position controller to execute the inventive position control method, when the controller program is stored in the program memory of the position controller and executed by the work facility of the position controller.

BRIEF DESCRIPTION OF THE DRAWINGS

Further advantages and details will emerge from the description which follows of exemplary embodiments in conjunction with the drawings, in which essentially:

FIG. 1 shows a position controller,

FIGS. 2 to 7 show variants of the position controller in FIG. 1 and

DETAILED DESCRIPTION OF INVENTION

Figure 3:
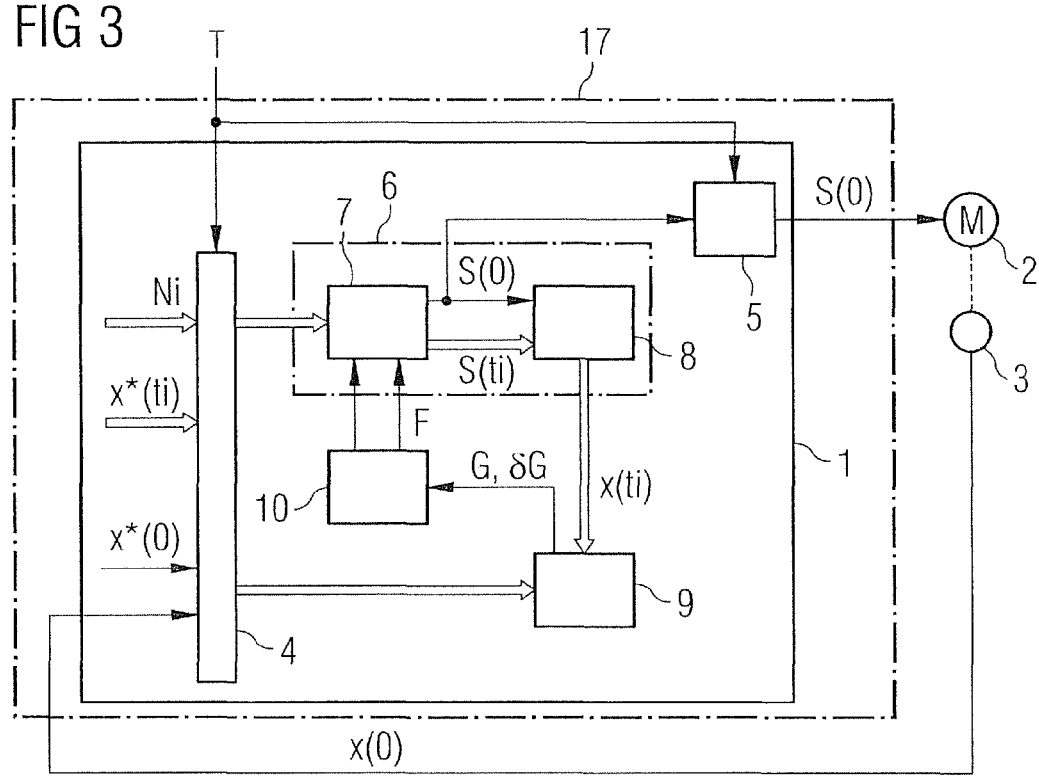

An instantaneous actual position value $x(0)$ is predefined for the position controller 1. The actual position value $x(0)$ can be captured for example by means of a position sensor 3 and supplied to the position controller 1. An instantaneous setpoint position value $x^*(0)$ is also predefined for the position controller 1.

A number n of future setpoint position values $x^*(t_i)$ ($i=1, \ldots, n$) is also predefined for the position controller 1.

The number n of future setpoint position values $x^*(t_i)$ is minimum 1. It is generally greater than 1. This is indicated in FIG. 1 in that a broad arrow is used for the future setpoint position values $x^*(t_i)$, because it can be a vectorial variable. In contrast simple arrows are used in FIG. 1 for the instantaneous setpoint position value $x^*(0)$ and the instantaneous actual position value $x(0)$, because these are scalar variables.

Finally execution times $t_i$ ($i=1, \ldots, n$) of the future setpoint position values $x^*(t_i)$ and/or temporal offsets $\delta t_i$ ($i=1, \ldots, n$) of the future setpoint position values $x^*(t_i)$ are predefined for the position controller 1. The execution times $t_i$ correspond to the time difference between the instantaneous setpoint position value $x^*(0)$ and the respective future setpoint position value $x^*(t_i)$. The temporal offsets $\delta t_i$ correspond to the time difference between the respective future setpoint position value $x^*(t_i)$ and the respectively immediately preceding setpoint position value $x^*(0)$ and/or $x^*(t_i)$ ($i=1, \ldots, n-1$).

The temporal offsets $\delta t_i$ can generally be predefined individually. Their number n corresponds in this instance to the number n of future setpoint position values $x^*(t_i)$. For this reason a broad arrow is also used in FIG. 1 for the supply of the temporal offsets $\delta t_i$ and/or the execution times $t_i$.

The position controller 1 receives the instantaneous actual position value $x(0)$, the instantaneous setpoint position value $x^*(0)$, the future setpoint position values $x^*(t_i)$ and the temporal offsets $\delta t_i$ and/or the execution times $t_i$ with a work cycle T. It outputs an instantaneous manipulated variable $S(0)$ to the axle 2 with the same work cycle T. It therefore actuates the axle 2 according to the instantaneous manipulated variable $S(0)$.

Actuation of the axle 2 can take place immediately. Subordinate controllers are preferably arranged between the position controller 1 and the axle 2, for example a speed controller and/or a current regulator.

The work cycle T can be more than one millisecond, for example between one and 20 milliseconds. If the axle is highly dynamic, it can be below one millisecond, for example around 20 µs to one millisecond, in particular between 50 and 300 µs. A particularly preferred work cycle T is around 125 µs.

According to FIG. 1 the position controller 1 has an input-side buffer element 4 to receive the instantaneous actual position value $x(0)$, the instantaneous setpoint position value $x^*(0)$, the future setpoint position values $x^*(t_i)$ and the temporal offsets $\delta t_i$ and/or the execution times $t_i$. It also has an output-side buffer element 5 to output the instantaneous manipulated variable $S(0)$. The buffer elements 4, 5 can be configured for example as sample and hold elements. Other realizations are also possible.

The position controller 1 has an internal model 6 of the axle 2. The model 6 has a manipulated variable determination unit 7 and an actual value determination unit 8. The variables $x(0)$, $x^*(0)$, $x^*(t_i)$ and $\delta t_i$ buffered in the input-side buffer element 4 are supplied to the manipulated variable determination unit 7. The manipulated variable determination unit 7 determines the instantaneous manipulated variable $S(0)$ and an expected manipulated variable $S(t_i)$ respectively for the future setpoint position values $x^*(t_i)$ ($i=1, \ldots, n-1$ or $i=1, \ldots, n$). The manipulated variable determination unit 7 outputs the manipulated variables $S(0)$, $S(t_i)$ to the actual value determination unit 8.

The actual value determination unit 8 uses the manipulated variables $S(0)$, $S(t_i)$ to determine an expected actual position value $x(t_i)$ respectively for the future setpoint position values $x^*(t_i)$ ($i=1, \ldots, n$) and outputs the expected actual position values x(ti) to a deviation determination unit 9. The deviation determination unit 9 determines an overall deviation G of the instantaneous and expected actual position values x(0), x(ti) from the corresponding setpoint position values x*(0), x*(ti) according to a predetermined evaluation function. It supplies the overall deviation G to an optimizer 10. In some instances the deviation determination unit 9 can supply a deviation change δG (in other words the difference between the overall deviation G now determined and an overall deviation G determined in the immediately preceding iteration) to the optimizer 10 in addition to the overall deviation G.

The optimizer 10 checks whether and in some instances how the manipulated variables S(0), S(ti) should be varied. In particular if the total of the overall deviation (G) is more than a predefined deviation limit and/or the total deviation change δG is more than a predefined change limit, the optimizer 10 varies the manipulated variables S(0), S(ti) to minimize the overall deviation G. Otherwise it is assumed that the manipulated variables S(0), S(ti) can no longer be optimized further. The optimizer then outputs an enable signal F for example to the manipulated variable determination unit 7. On receipt of the enable signal F, the manipulated variable determination unit 7 outputs the last determined instantaneous manipulated variable S(0) to the output-side buffer element 5.

It can be seen from the above that the position controller 1 determines the manipulated variables S(0), S(ti) and the expected actual position values x(ti) in such a manner that the overall deviation G is minimized or more generally optimized.

FIGS. 2 to 5 show variations of the basic principle described above in conjunction with FIG. 1. Only differences compared with FIG. 1 are examined in more detail below in conjunction with FIGS. 2 to 5. The other details relating to FIG. 1 remain applicable.

According to FIG. 2 the temporal offset δti is identical for all future setpoint position values x*(ti). It can therefore be redefined for the position controller 1 as an individual scalar value δt (hereafter referred to as the basic temporal offset δt). If the basic temporal offset δt is already known to the position controller 1, it is even possible to dispense with the specific supplying of the basic temporal offset δt to the position controller 1.

According to FIG. 3 the temporal offset δti is a whole-number multiple Ni of the work cycle T for every future setpoint position value x*(ti). Instead of the temporal offsets δti per se the corresponding whole-number multiples Ni can be predefined for the position controller 1. In this instance the position controller 1 automatically uses the whole-number multiples Ni and the work cycle T to determine the respective temporal offset δti.

Figure 4:
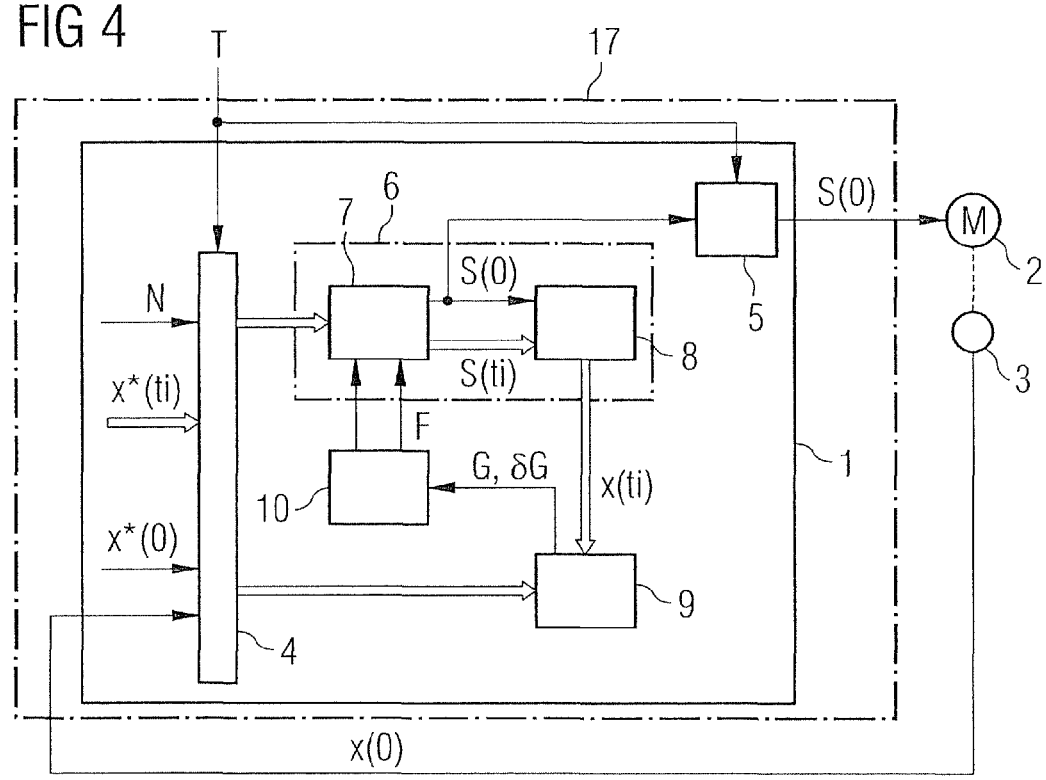

FIG. 4 combines the procedures in FIGS. 2 and 3. It is then possible to predefine just an individual whole-number value N (hereafter referred to as basic value N) for the position controller 1 instead of the basic temporal offset δt. If the basic value N is already known to the position controller 1, it is not necessary to supply it to the position controller 1.

The basic value N can be different from one. Alternatively it can have the value one. It is then possible according to FIG. 5 only to supply the temporally last future setpoint position value x*(ti) respectively to the position controller 1 (where n=number of future setpoint position values), as in this instance the other future setpoint position values x*(ti) and the instantaneous setpoint position value x*(0) have already been supplied beforehand to the position controller 1. Only a timed shifting of the setpoint position values x*(0), x*(ti) stored in the input-side buffer element 4 is then necessary—similar to the mode of operation of a shift register.

It is always possible to supply the setpoint position values x*(0), x*(ti) per se to the position controller 1. In some instances it is alternatively possible for the position controller 1 to determine the setpoint position values x*(0), x*(ti) automatically. This is described in more detail below in conjunction with FIGS. 6 and 7.

FIG. 6 is an extension of the embodiment in FIG. 1. According to FIG. 6 the position controller 1 has a setpoint value determination unit 11 on the input side. The setpoint value determination unit 11 is likewise timed with the work cycle T.

An instantaneous reference value X(0) and a number of future reference values (X(ti) are supplied to the setpoint value determination unit 11. The setpoint value determination unit 11 uses a predetermined functional relationship for each reference value X(0), X(ti) to determine a corresponding setpoint position value x*(0), x*(ti) and outputs it to the input-side buffer element 4. The other details relating to FIG. 1 remain valid.

The functional relationship of the setpoint position values x*(0), x*(ti) to the reference values X(0), X(ti) must be known to the setpoint value determination unit 11. It can alternatively be permanently predefined for (or programmed into) or parameterizable for the setpoint value determination unit 11.

The embodiment according to FIG. 6 can not only be used in conjunction with the embodiment according to FIG. 1. As an alternative it can be combined with the embodiments according to FIGS. 2 to 4. A combination with the embodiment according to FIG. 5 is also possible. In this instance only the temporally last future reference value X(nT) has to be supplied to the setpoint value determination unit 11. The setpoint value determination unit 11 only has to use the temporally last future reference value X(nT) to determine the temporally last future setpoint position value x*(nT).

Figure 7:
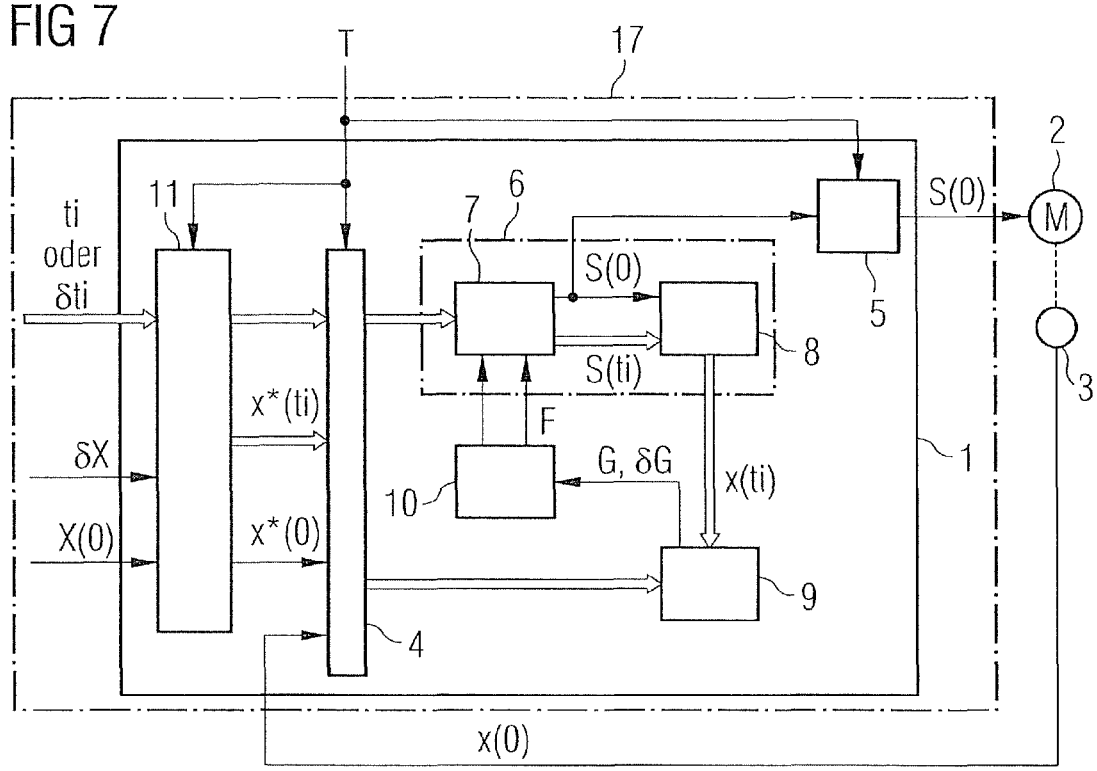

FIG. 7 also shows a modification of the embodiment in FIG. 6. According to FIG. 7 the instantaneous reference value X(0), a reference value change δX and a number n of temporal offsets δti are predefined for the setpoint value determination unit 11. The temporal offsets δti can alternatively be predefined explicitly for the setpoint value determination unit 11 or can be predefined implicitly as in FIGS. 2 to 5—for example by the work cycle T.

With the embodiment in FIG. 7 in a first step the setpoint value determination unit 11 uses the instantaneous reference value X(0) or the temporally immediately preceding reference value X(ti) (i=1, ..., n−1) and the reference value change δX to determine the corresponding future reference value X(ti) (i=1, ..., n) for the relevant temporal offset δti for each temporal offset δti. In a second step the setpoint value determination unit 11 uses the respective reference value X(0), X(ti) to determine the corresponding setpoint position value x*(0), x*(ti).

It is possible for the reference value change δX to be temporally constant, in other words not to be variable. It is then possible but not essential to predefine the reference value change δti explicitly for the setpoint value determination unit 11. It can also be set internally.

The procedure according to FIG. 7 can be combined not only with the embodiment in FIG. 1 but also with the embodiments according to FIGS. 2 to 5.

Figure 8:
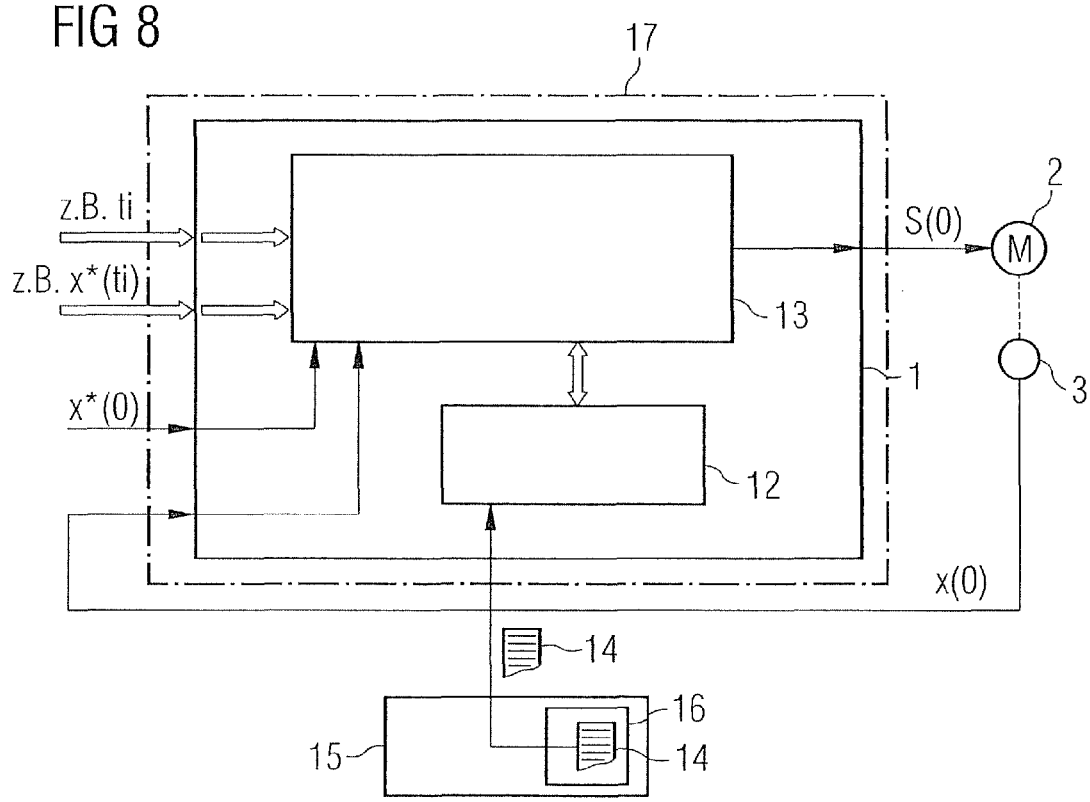
FIG. 8 shows a further variant of the position controller in FIG. 1.

With the embodiments described above in conjunction with FIGS. 1 to 7 it has been assumed that the circuits of the position controller 1 are configured in such a manner that it executes one of the position control methods described above. This embodiment is possible but not essential. As an alternative to the circuit-based embodiment it is possible according to FIG. 8 for the position controller 1 to have a program memory 12 and a work facility 13. A controller program 14 is then stored in the program memory 12. The work facility 13 is connected to the program memory 12. It can execute the controller program 14. When the work facility 13 processes the controller program 14, it executes one of the inventive position control methods described above. The work facility 13 is generally configured as a microprocessor or a microcontroller. The elements 4 to 10 (or 11) in FIGS. 1 to 7 are realized as software blocks in the embodiment in FIG. 8.

A suitable programming facility 15 can be coupled to the program memory 12 to store the controller program 14 in the program memory 12. The programming facility 15 has a data medium 16, in which the controller program 14 is stored. The data medium 16 can be a hard disk or a removable data medium (USB stick, CD-ROM, etc.) for example.

Regardless of whether the position controller 1 (according to FIGS. 1 to 7) realizes the position control method in a circuit-based manner or whether the position control method (according to FIG. 8) is realized by corresponding programming, the position controller 1 can be made up of discrete structural elements. However the position controller is preferably integrated in an ASIC 17.

The position control method and the position controller 1 can be used in a simple manner to achieve considerably more efficient position control of the axle 2 than with the prior art.

The above description serves solely to describe the present invention. The scope of protection of the present invention should in contrast be determined by the accompanying claims.

The invention claimed is:

1. A position control method for an axle, comprising:
predefining a reference value and a position value for a position controller;
predefining a reference value change and a temporal offset between respectively immediately successive reference values for the position controller;
determining future reference values by the position controller, wherein the position controller uses the reference value, the reference value change and the temporal offset;
determining the corresponding setpoint position values by the position controller, wherein the position controller uses the reference values;
determining a manipulated variable and for a future setpoint position value an expected manipulated variable and an expected position value respectively by the position controller, wherein the position controller uses a model of the axle, and wherein an overall deviation of the position value and the expected position value from the corresponding setpoint position value is optimized according to a predetermined evaluation function; and
actuating the axle according to the manipulated variable by the position controller.

2. The position control method as claimed in claim 1, wherein the method is executed by a position controller.

3. The position control method as claimed in claim 2, wherein the position controller is integrated in an ASIC.

4. The position control method as claimed in claim 2, wherein the position controller has a program memory and a work device connected to the program memory, a controller program is stored in the program memory and the controller program is executed by the work device.

5. A computer readable medium storing a computer program, wherein the computer program is connected to a work device and executed by the work device, and during processing of the controller program the work device executes a position control method, comprising:
predefining a reference value and a position value for a position controller;
predefining a reference value change and a temporal offset between respectively immediately successive reference values for the position controller;
determining future reference values by the position controller, wherein the position controller uses the reference value, the reference value change and the temporal offset;
determining the corresponding setpoint position values by the position controller, wherein the position controller uses the reference values;
determining a manipulated variable and for a future setpoint position value an expected manipulated variable and an expected position value respectively by the position controller, wherein the position controller uses a model of the axle, and wherein an overall deviation of the position value and the expected position value from the corresponding setpoint position value is optimized according to a predetermined evaluation function; and
actuating the axle according to the manipulated variable by the position controller.

* * * * *